Figure 1:
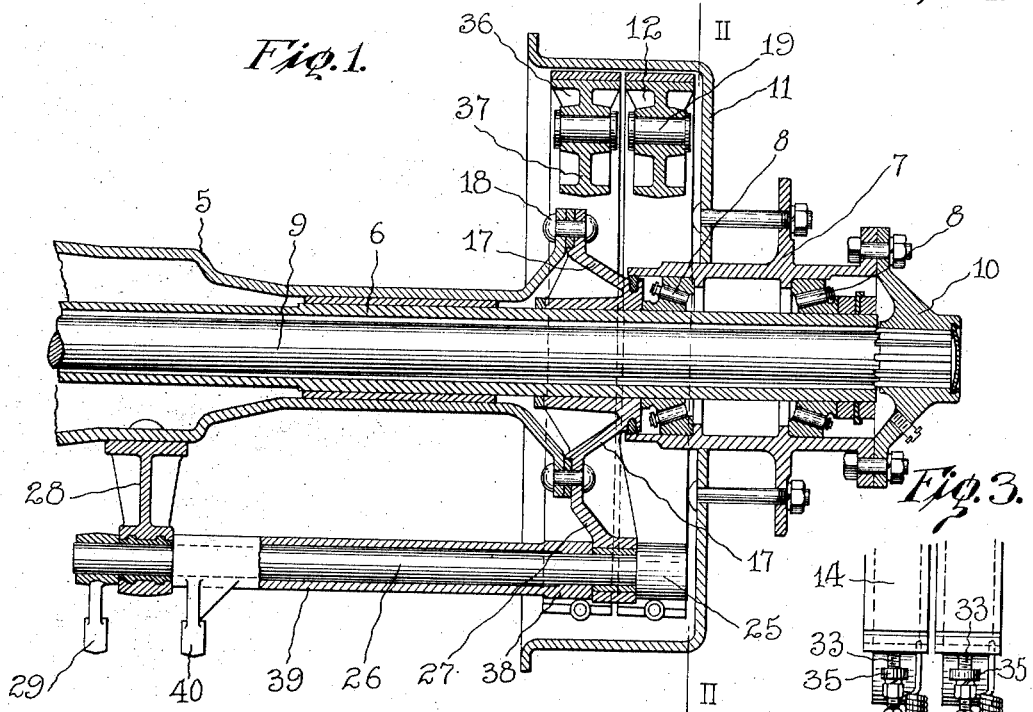

J. W. WHITE, Jr.
VEHICLE BRAKE.
APPLICATION FILED APR. 5, 1919.

1,372,166.

Patented Mar. 22, 1921.

John W. White Jr., Inventor

Attorney Lloyd Blackmore

UNITED STATES PATENT OFFICE.

JOHN W. WHITE, JR., OF DETROIT, MICHIGAN, ASSIGNOR TO GENERAL MOTORS CORPORATION, OF DETROIT, MICHIGAN, A CORPORATION OF DELAWARE.

VEHICLE-BRAKE.

1,372,166.

Specification of Letters Patent.

Patented Mar. 22, 1921.

Application filed April 5, 1919. Serial No. 287,895.

*To all whom it may concern:*

Be it known that I, JOHN W. WHITE, Jr., a citizen of the United States, and resident of Detroit, Wayne county, State of Michigan, have invented certain new and useful Improvements in Vehicle-Brakes, of which the following is a specification.

My invention relates to brakes designed for use with automobiles, motor trucks and similar vehicles, although it is capable of use in any connection where the movement of a rotating body has to be arrested; and particularly in brake mechanism of the general type or class wherein a rotating brake drum cylindrical in form is employed in connection with brake shoes adapted to be forced into contact with the inner surface of said drum, to thereby arrest the movement thereof.

The object of my invention is to provide brake mechanism of the type or class above referred to which will be simpler in construction and which may be more readily and cheaply manufactured than has heretofore commonly been the case, and which is less liable to get out of order or adjustment than has been the case in prior brake mechanisms of the type to which my invention relates.

A further object of my invention is to provide a brake mechanism of the class referred to wherein improved means are provided for adjusting the position of the brake shoes relative to the inner surface of the brake drum with which they coöperate, to thereby cause the peripheral surfaces of said shoes to be concentric with and to be close to the surface in question when the brakes are off.

A further object of my invention is to provide improved brake mechanism of the class referred to wherein the brake shoes are pressed against the inner surface of the brake drum throughout substantially their entire peripheries when the brakes are applied, whereby uniformity or substantial uniformity of pressure throughout the entire area of the brake shoes follows and a more even distribution of the wear throughout the peripheries of the shoes, or throughout the linings with which they are ordinarily provided, is secured through the life of the linings or shoes.

With the above and other objects of invention in view, my invention consists in the improved brake mechanism illustrated in the accompanying drawing and hereinafter described and claimed; and in such variations and modifications thereof as will be obvious to those skilled in the art to which my invention relates.

Figure 3:
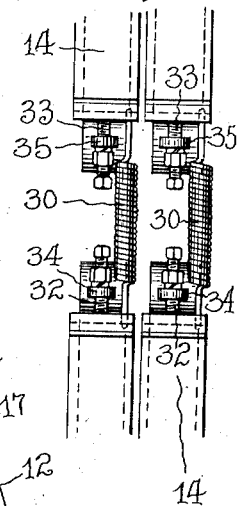
Figure 2:
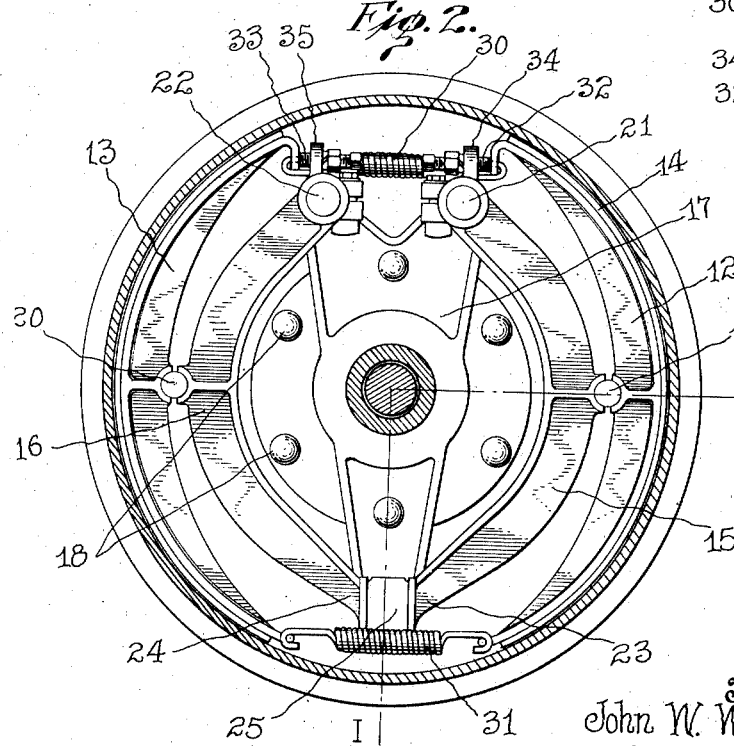

In the drawing accompanying and forming a part of this specification and wherein the preferable embodiment of my invention is illustrated:

Figure 1 is a view showing my improved brake mechanism upon two longitudinally extending planes the positions of which are indicated by the lines 1, 1, Fig. 2;

Fig. 2 is a view showing a section upon a transverse plane indicated by the line 2, 2, Fig. 1, looking to the left, the shell of the hub of the vehicle and the bearing which would otherwise show having been omitted to avoid confusion; and, Fig. 3 is a detail view showing springs acting between the free ends of the brake shoes to draw them toward one another, together with the stops for positioning the shoes, this mechanism being the same as that shown at the upper part of Fig. 2.

Referring to the drawing, the reference numeral 5 designates the housing of the rear axle of a motor vehicle, and 6 designates the usual wheel supporting tube located within said housing and the free outer end of which supports the hub 7 of the vehicle through suitable roller or other form of bearings shown at 8; the hub and, consequently, the wheel of the vehicle being driven from the driving axle 9 through a driving connection or clutch 10 at the outer end of the hub. The axle 9 is illustrated as of the full floating variety, although it will be appreciated that my invention is not limited to any particular method of driving the wheel, nor to any particular form or construction of rear axle housing.

Secured to the wheel so as to rotate with the hub 7 thereof is a brake drum 11 cylindrical in form and with the inner periphery of the cylindrical portion of which the two brake shoes 12, 13 of my improved mechanism engage; said brake shoes being forced outwardly and into frictional engagement with the interior of the drum when the brakes are applied, as will be appreciated. These brake shoes 12, 13 are commonly provided with the usual asbestos fabric or other type of facing material indicated by the reference numeral 14, and they are forced outwardly and into frictional engagement with the interior of the drum by two brake shoe supporting members or arms designated by the reference numerals 15, 16. The brake shoe supporting arms are themselves supported by a non-rotatable spider or support designated by the reference numeral 17, said support being shown as secured to a flange at the free outer end of the axle housing 5 by means of rivets or equivalent fastening means designated by the reference numeral 18.

The operative connection or engagement between the brake shoe supporting arms and the brake shoes operated thereby are located at the middle portions of the brake shoes, as indicated at 19, 20; and such connections are of a pivotal character so that a slight rocking movement of the brake shoes relative to the supporting arms whereby they are carried may occur as the brakes are applied, or during the adjustment of the shoes in order to position their peripheries properly relative to the inner surface of the brake drum.

The brake shoe supporting arms are pivotally connected with the spider or support 17 through pivotal connections located adjacent one another and indicated by the reference numeral 21, 22, these pivotal connections being shown at the upper part of Fig. 2. The other or free ends 23, 24 of these supporting members or arms are brought into a position adjacent one another, as shown in the lower portion of Fig. 2, and between these free ends an oscillating cam 25 is arranged; said cam being shown as carried at the free end of an oscillating shaft 26 one end of which is supported by the support or spider 17, and the other end of which is supported by the pedestal 28 carried by the housing 5 of the rear axle. This shaft is operated by an arm 29; from which it will be appreciated that when angular movement is imparted to said shaft the free ends 23, 24 of the shoe carrying members will be forced apart by the cam 25, and the brake shoes forced into engagement with the inner surface of the brake drum.

The free ends of the brake shoes 12, 13 are acted upon by oppositely located coil springs 30, 31, the free ends of which are shown as provided with hooks which engage with the free ends of the shoes, as best shown in Fig. 2; whereby it will be appreciated that the upper and lower free ends of the shoes will be drawn toward one another by the springs, the action of said springs being obviously to move the brake shoes bodily away from the inner surface of the brake drum. Incidentally, these springs take up lost motion at the pivotal connections 19, 20 between the brake shoes and their operating levers and maintain the elements which form the pivotal connection in permanent contact with one another, thereby taking up wear and preventing looseness at the pivotal connections.

The upper one 30 of the springs acting upon a pair of shoes is of slightly greater tension than the lower spring; and adjustable stop members in the form of set screws 32, 33 are provided for adjusting the brake shoes, it being obvious that the shoes may be tipped slightly upon the pivotal connections 19, 20 and the peripheries of the shoes made to assume positions concentric with the interior of the brake drum by screwing the set screws inwardly or outwardly in the threaded openings in which they are located. These screws are shown as carried by the supporting arms 15, 16, the threaded openings in which they are located being provided in arms or lugs 34, 35 provided upon said arms near the pivotal connections 21, 22 between them and the spider 17.

In view of the premises it will be appreciated that when angular movement is imparted to the cam 25 the free ends of the brake shoe supporting arms or members will be forced apart, and the shoes thus moved toward and into contact with the inner surface of the brake drum. The shoes will be forced into engagement with the interior of the drum throughout their entire peripheral surfaces, because of the rocking movement permitted by the pivotal connections 19, 20; and, the peripheries of the shoes being normally so adjusted as to lie close to the inner surface of the drum, contact between said peripheries and the interior of the drum will take place throughout the entire bearing area of the shoes at one and the same time.

The springs 30, 31 move the brake shoes bodily away from the inner surface of the brake drum as the brakes are released, and the set screws 32, 33 permit the shoes to be so adjusted that their peripheries are concentric with, and as close as may be desired to the inner surface of the brake drum.

The upper ends of the brake shoes, referring to Fig. 2, are normally in contact with the free ends of the said screws 32, 33, because the spring 30 is made slightly stronger than the spring 31; although it will be appreciated that the free ends of the shoes are moved out of engagement with the stops during the application of the brakes, so that when the brakes are in contact with the brake drum the ends in question are free from the stops, and the shoes are free to rock upon the pivotal connections 19, 20 through which they are forced against the brake drum, whereby an equalization of pressure throughout the contacting areas of the shoes is secured.

It will of course be appreciated that the mechanism hereinbefore described is duplicated at the two ends of the axle of the vehicle, although it is believed to be unnecessary to show a complete axle so equipped. Furthermore, in the embodiment of my invention illustrated I have shown two pairs of brake shoes located within a single drum, and arranged side by side within the same, the second pair of shoes being supported by a second pair of supporting arms or members similar in all respects to the members 15, 16 and both pairs of shoes and their operating mechanism being supported from the same spider or support 17. One of the brake shoes of the second set is indicated by the reference numeral 36 in Fig. 1, and the operating arms or members for the second pair of brake shoes, one of which members is shown at 37, are operated by an oscillating cam 38 at the free end of a tubular shaft 39 surrounding the shaft 26, which tubular shaft is operated by the arm 40; the arrangement of the entire brake mechanism being ordinarily such that both pairs of brake shoes are applied simultaneously to thereby secure greater braking action, from which it of course follows that a single pair of shoes may be used in cases where a single pair will provide sufficient braking action.

Having thus described and explained my invention, I claim and desire to secure by Letters Patent:

1. In brake mechanism of the class described, a rotatable brake drum cylindrical in form; a non-rotatable support located within said drum; two brake shoe supporting arms carried by and pivotally connected with said support, and the free ends of which arms lie adjacent one another; an oscillating cam supported by said support and located between the free ends of said arms; two brake shoes disposed within said brake drum and operated by said arms through pivotal connections located adjacent the middle portions of said shoes; two oppositely located springs the ends of which are connected with the free ends of said brake shoes, and which springs tend to move said shoes bodily away from the inner surface of said brake drum; and two set screws carried one by each of said arms and the ends of which screws engage the adjacent ends of said brake shoes to thereby provide adjustable stops for positioning said shoes relative to the interior of said brake drum.

2. In brake mechanism of the class described, a rotatable brake drum cylindrical in form; a non-rotatable support located within said drum; two brake shoe supporting arms carried by and pivotally connected with said support, and the free ends of which arms lie adjacent one another; means for forcing the free ends of said arms apart from one another; two brake shoes disposed within said brake drum and operated by said arms through pivotal connections located adjacent the middle portions of said shoes; two oppositely located springs acting between the free ends of said brake shoes and tending to move said shoes bodily away from the inner surface of said drum; and two set screws, the ends of which are adapted to engage adjacent free ends of said brake shoes to thereby provide adjustable stops for positioning said shoes relative to the interior of said brake drum.

3. In brake mechanism of the class described, a rotatable brake drum cylindrical in form; a non-rotatable support located within said drum; two brake shoe supporting arms carried by and pivotally connected with said support, and the free ends of which arms lie adjacent one another; an oscillating cam located between the free ends of said arms and adapted to force them apart; two brake shoes disposed within said brake drum and operated by said arms through pivotal connections located adjacent the middle portions of said shoes; two oppositely located springs acting between the free ends of said brake shoes and tending to move said shoes bodily away from the inner surface of said drum; and adjustable stop mechanism located adjacent one of said springs and adapted to limit the movement of the free ends of the shoes with which they coöperate toward one another.

4. In brake mechanism of the class described, a rotatable brake drum cylindrical in form; a non-rotatable support located within said drum; two brake shoe supporting arms carried by and pivotally connected with said support and the free ends of which arms lie adjacent one another; means for forcing the free ends of said arms apart to thereby apply the brakes; two brake shoes disposed within said brake drum and operated by said arms through pivotal connections located adjacent the middle portions of said arms and shoes; two springs acting between the free ends of said brake shoes and tending to move said shoes bodily away from the inner surface of said drum; and adjustable stops coöperating with adjacent free ends of said brake shoes to thereby adjust the peripheral surfaces of said shoes relative to the inner surface of said brake drum.

5. In brake mechanism of the class described, a rotatable brake drum cylindrical in form; a non-rotatable support located within said drum; a brake shoe supporting arm carried by and pivotally connected with said support; a brake shoe carried by said arm and operated thereby through a pivotal connection located adjacent the middle portion of the shoe; means engaging the free end of said supporting arm and adapted to operate the same to thereby move said brake shoe into engagement with the inner surface of said drum; two springs operatively connected one with each free end of said brake shoe and tending to move the same bodily away from the inner surface of said brake drum; and an adjustable stop member coöperating with one free end of said brake shoe to thereby adjust the same relative to the interior of said brake drum.

6. In brake mechanism of the class described, a rotatable brake drum cylindrical in form; a non-rotatable support located within said drum; a brake shoe supporting member carried by and pivotally connected with said support; a brake shoe carried by said supporting member and operated thereby through a pivotal connection located adjacent the middle portion of the shoe; means engaging the free end of said supporting member and adapted to operate the same to thereby move said brake shoe into engagement with the inner surface of said drum; two springs operatively connected one with each free end of said brake shoe and tending to move the same bodily away from the inner surface of said brake drum; and a set screw carried by said supporting member and the free end of which is adapted to engage one free end of said brake shoe to thereby adjust the periphery thereof relative to the interior of said brake drum.

7. In brake mechanism of the class described, a rotatable brake drum cylindrical in form; a non-rotatable support located within said drum; a brake shoe supporting member carried by and pivotally connected with said support; a brake shoe carried by said supporting member and operated thereby through a pivotal connection located adjacent the middle portions of said supporting member and shoe; means engaging the free end of said supporting member and adapted to operate the same to thereby move said brake shoe into engagement with the inner surface of said drum; two springs operatively connected one with each free end of said brake shoe and tending to move the same bodily away from the inner surface of said brake drum; and a set screw carried by said brake shoe supporting member and located adjacent the pivotal connection between the same and said support, and the free end of which set screw is adapted to engage the adjacent free end of said brake shoe and thereby adjust the periphery of said shoe relative to the inner surface of said brake drum.

8. In brake mechanism of the class described, a hollow rotatable brake drum; a non-rotatable support located within said drum; two brake shoe supporting arms supported by and pivotally connected with said support; means for swinging said arms about the pivotal connections aforesaid to thereby apply the brakes; two brake shoes located within said brake drum and to which movement is transmitted from said arms through pivotal bearings one between each shoe and the arm associated therewith; and two springs normally under tension and the ends of which are connected with said brake shoes, and which springs tend to move said shoes bodily away from the inner surface of said drum.

9. In brake mechanism of the class described, a hollow rotatable brake drum; a non-rotatable support located within said drum; two brake shoe supporting arms supported by and pivotally connected with said support; means for swinging said arms about the pivotal connections aforesaid to thereby apply the brakes; wo brake shoes located within said brake drum and to which movement is transmitted from said arms through pivotal bearings one between each shoe and the arm associated therewith; two springs normally under tension and the ends of which are connected with said brake shoes, and which springs tend to move said shoes bodily away from the inner surface of said drum; and adjustable stop mechanism associated with said brake shoes and adapted to adjust the peripheral surfaces thereof relative to the inner surface of said brake drum.

10. In brake mechanism of the class described, a hollow rotatable brake drum; a non-rotatable support located within said drum; a brake shoe supporting member carried by and pivotally connected with said support; a brake shoe supported by said supporting member and to which movement is communicated from said member through a pivotal bearing; means in operative engagement with said supporting member and adapted to swing the same about the pivotal connection aforesaid to thereby move said brake shoe into engagement with the inner surface of said drum; and two springs acting upon said brake shoe in opposition to one another and tending to move said brake shoe bodily away from the inner surface of said brake drum.

11. In brake mechanism of the class described, a hollow rotatable brake drum; a non-rotatable support located within said drum; a brake shoe supporting member carried by and one end of which is pivotally connected with said support; a brake shoe supported by said supporting member and to which movement is transmitted from said member through a pivotal bearing located adjacent the middle portion of said shoe; means in operative engagement with the free end of said supporting member for swinging the same about the pivotal connection aforesaid to thereby move said brake shoe into engagement with the interior of said drum; two springs acting upon said brake shoe in opposition to one another and tending to move said shoe bodily away from the inner surface of said brake drum; and adjustable stop mechanism associated with said brake shoe and whereby the peripheral surface thereof may be adjusted relative to the interior of said brake drum.

12. In brake mechanism of the class described, a rotatable brake drum; a non-rotatable support; two brake shoe supporting members one end of each of which is pivotally connected with said support; operating means engaging the free ends of said brake shoe supporting members to swing them about their points of pivotal support when the brakes are to be applied; two brake shoes one associated with each of said supporting members and to which shoes movement is communicated from said members through pivotal bearings which are located adjacent the middle portions of said shoes; and two springs normally under tension and the ends of which are connected with said brake shoes upon opposite sides of the pivotal bearings aforesaid, and which springs tend to move said brake shoes toward one another.

13. In brake mechanism of the class described, a rotatable brake drum; a non-rotatable support; two brake shoe supporting members one end of each of which is pivotally connected with said support; operating means engaging the free ends of said brake shoe supporting members to swing them about their points of pivotal support when the brakes are to be applied; two brake shoes one associated with each of said supporting members and to which shoes movement is communicated from said members through pivotal bearings which are located adjacent the middle portions of said shoes; two springs normally under tension and the ends of which are connected with said brake shoes upon opposite sides of the pivotal bearings aforesaid, and which springs tend to move said brake shoes toward one another; and adjustable stop mechanism associated with said brake shoes and whereby the friction surfaces of said shoes may be adjusted relative to the periphery of said brake drum.

In testimony whereof I affix my signature.

J. W. WHITE, Jr.